US009157466B2

(12) United States Patent
Hardy et al.

(10) Patent No.: US 9,157,466 B2
(45) Date of Patent: Oct. 13, 2015

(54) RETENTION CLIP ASSEMBLY

(71) Applicant: Toyota Motor Engineering & Manufacturing North America, Inc., Erlanger, KY (US)

(72) Inventors: William A. Hardy, Tecumseh, MI (US); Edgar C. Herrera, San Antonio, TX (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 243 days.

(21) Appl. No.: 13/628,351

(22) Filed: Sep. 27, 2012

(65) Prior Publication Data

US 2014/0082899 A1    Mar. 27, 2014

(51) Int. Cl.
*F16B 2/22* (2006.01)
*F16B 21/08* (2006.01)
*F16B 5/06* (2006.01)

(52) U.S. Cl.
CPC ............. *F16B 21/086* (2013.01); *F16B 5/0664* (2013.01); *Y10T 24/309* (2015.01); *Y10T 24/42* (2015.01); *Y10T 24/44752* (2015.01); *Y10T 24/45* (2015.01); *Y10T 24/45984* (2015.01)

(58) Field of Classification Search
CPC ........ F16B 21/00; F16B 21/08; F16B 21/088; F16B 5/065; F16B 5/0642; F16B 5/0664; F16B 2/20; B60R 13/0206
USPC ............. 24/543, 297, 458, 572.1, 698.1, 700, 24/289, 453; 403/321, 326, 397, 361; 296/1.08, 214
See application file for complete search history.

(56) References Cited

U.S. PATENT DOCUMENTS

| | | | |
|---|---|---|---|
| 3,574,899 A | 4/1971 | Fisher | |
| 4,400,922 A | 8/1983 | Boyer | |
| 4,609,171 A * | 9/1986 | Matsui | 248/74.3 |
| 5,039,040 A | 8/1991 | Idjakiren | |
| 5,423,831 A * | 6/1995 | Nates | 606/120 |
| 5,636,488 A | 6/1997 | Lawrence et al. | |
| 5,815,894 A * | 10/1998 | Soriano | 24/510 |
| 6,164,603 A * | 12/2000 | Kawai | 248/73 |
| 7,062,822 B2 * | 6/2006 | Folkmar | 24/30.5 R |

* cited by examiner

*Primary Examiner* — Robert J Sandy
*Assistant Examiner* — Michael Lee
(74) *Attorney, Agent, or Firm* — Dinsmore & Shohl LLP

(57) ABSTRACT

A retention clip assembly for connecting first and second components together. The retention clip assembly includes a male member configured to engage a female member. The male member includes a body portion with a tab extending therefrom. A terminal end of the tab includes a flange projecting laterally from a side surface. The female member includes body portion having sides defining an opening into which the tab of the male member is received. A rib of the female member is located adjacent to one of the sides defining the opening so as to form a slot being between the rib and adjacent side of the opening. The flange is constantly biased into contact with the rib when the male and female members are engaged.

13 Claims, 2 Drawing Sheets

RETENTION CLIP ASSEMBLY

BACKGROUND

1. Field of the Invention

The present invention generally relates to retention clips. More specifically, the invention relates to a retention clip assembly for securing two components together utilizing male and female portions of the retention clip assembly.

2. Description of Related Art

In automotive vehicles, various panels and components must be retained relative to one another. In order to achieve the retaining of these components, a variety of fasteners and clips are employed. One problem associated with the known fasteners and clips is that fasteners/clips may permit relative movement of the components or the fasteners and clips themselves, thereby resulting in noise and/or vibration in the vehicle that is audible to persons occupying the passenger compartment of the vehicle. Obviously, such noise and vibration is unwanted and may become a nuisance to the occupants of the vehicle.

Many styles of fasteners and clips exist. One style employs a head, attached to one component, that is inserted through opening in the other component. The head includes a feature that expands upon passing through the opening, thereby preventing the head from passing back out of the opening and releasing the two components from attachment with one another.

Known fasteners and clips, while designed to adequately retain the two components together, fail to retain the components in such a manner that relative movement, and therefore noise and vibration, is not generated by the engagement.

SUMMARY

In overcoming the enumerated drawbacks and other limitations of the know art, the present invention provides a retention clip assembly for connecting first and second components together. The retention clip assembly includes a male member and a female member. The male member is configured to engage the female member in an engaged position, and the male member has a male body portion with a tab extending from the male body portion. The tab includes a base end and a terminal end, the terminal end residing in a free position and being deflectable out of the free position. The free position further defines a free width relative to the male body portion. A flange also projects laterally from a side surface of the terminal end. The female member has a female body portion that include sides defining an opening configured to receive the tab of the male member therein. The female member further includes a rib adjacent to one of the sides defining the opening, and a slot is defined between the rib and the one of the sides defining the opening. The opening defines an opening width that is less than the free width. When the male member is engaged with the female member, the flange is positioned in the slot and is resiliently biased into contact with the rib.

In another aspect of the invention, the rib extends at an angle relative to the one of the sides defining the opening.

In a further aspect of the invention, the rib is obliquely oriented relative to the one of the sides defining the opening.

In an additional aspect of the invention, slot has a generally V-shaped cross section.

In yet another aspect of the invention, the tab includes a base end connected to the male body portion and a bight located intermediate of the base end and the terminal end. The base end extends in a first direction toward the bight, wherein the bight defines a reversely bent section. The terminal end extends from the bight in a direction generally toward the body portion and is spaced apart from the base end.

In still a further aspect of the invention, the flange projects laterally from a side surface on the terminal end that faces away from the base end.

In one additional aspect of the invention, the slot extends generally parallel to the one of the sides defining the opening.

In a further aspect of the invention, the flange contacts a surface of the rib that is generally obliquely oriented relative to the flange.

In another aspect of the invention, the flange is spaced a distance from the male body portion that permits movement of the male member into the female member into and over-insertion position with the flange remaining within the slot.

In yet another aspect of the invention, the flange in the over-insertion position is located out of a bottom portion of the slot.

In a further aspect of the invention flange in the over-insertion position is in contact with an obliquely oriented surface defining one sidewall of the slot.

In one aspect of the invention, a retention clip assembly for connecting first and second components together is provided, the retention clip assembly comprising: a male member and a female member, the male member being configured to engage the female member in an engaged position; the male member having a male body portion and a tab extending from the male body portion, the tab including a base end and a terminal end, the terminal end defining a free position and being deflectable out of the free position, the free position defining a free width relative to the male body portion, a flange projecting laterally from a side surface of the terminal end; the female member having a female body portion, the female body portion including sides defining an opening configured to receive the tab of the male member therein, the female member further including a rib adjacent to one of the sides defining the opening, a slot being defined between the rib and the one of the sides defining the opening; and wherein the opening defines an opening width that is less than the free width and the flange is positioned in the slot in the engaged position of the male member with the female member, the flange being resiliently biased into contact with a surface of the rib in the engaged position, the surface of the rib being generally obliquely oriented to a direction of projection of the flange from terminal end.

In another aspect of the invention, the slot has a generally V-shaped cross section.

In a further aspect of the invention, the tab includes a base end connected to the male body portion and a bight located intermediate of the base end and the terminal end, the base end extending in a first direction to the bight, the bight defining a reversely bent section and the terminal end extending from the bight in a direction generally toward the body portion and being spaced apart from the base end.

In an additional aspect of the invention, the flange projects laterally from a side surface on the terminal end that faces away from the base end.

In still another aspect of the invention, the slot extends generally parallel to the one of the sides defining the opening.

In yet a further aspect of the invention, the slot is defined by a surface on the rib and a surface on one of the sides defining the opening, the surface on one of the sides being generally parallel to the direction of projection of the flange from terminal end.

In another aspect of the invention, the flange is spaced a distance from the male body portion that permits movement of the male member into the female member into an over-insertion position with the flange remaining within the slot.

In still another aspect of the invention, the flange in the over-insertion position is located out of a bottom portion of the slot and is in contact with an obliquely oriented surface defining one sidewall of the slot.

Further objects, features and advantages of this invention will become readily apparent to persons skilled in the art after a review of the following description, with reference to the drawings and claims that are appended to and form a part of this specification.

DETAILED DESCRIPTION

Figure 1:
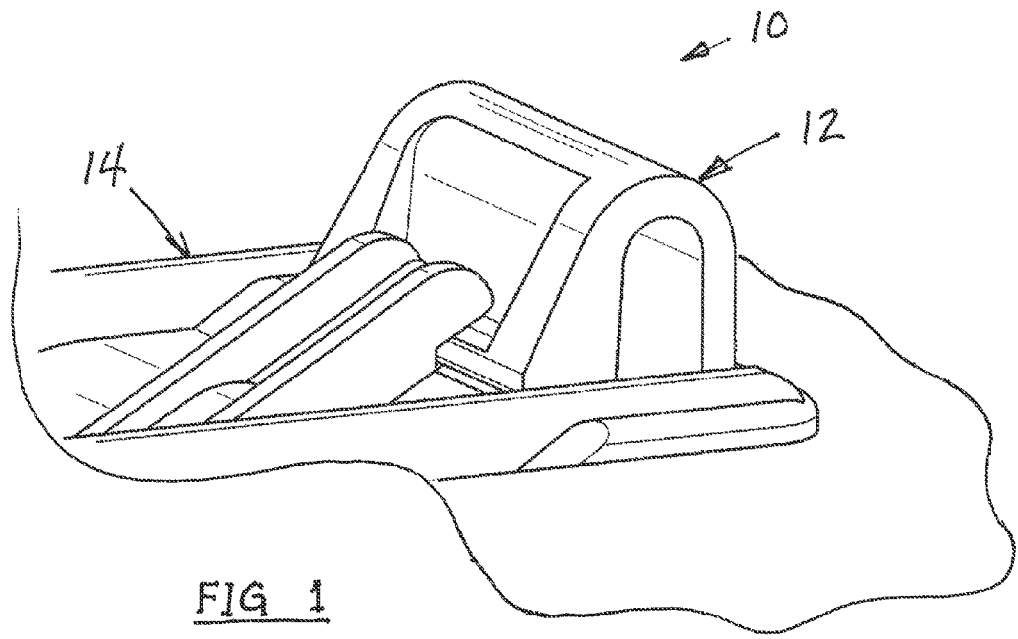
FIG. 1 is a perspective view of a clip assembly embodying the principles of the present invention in an engaged position.

Referring now to the drawings, a retention clip assembly embodying the principles of the present invention is illustrated therein and designated as 10. As its primary components, the retention clip assembly 10 includes a male member 12 and a female member 14. The male and female members 12, 14 are configured to matingly engage with one another and thereby secure two components, which may be integrally or unitarily formed with the male and female members 12, 14, to one another in a fixed, but releasable, engagement. The engaged position of the male and female members 12, 14 is generally seen in FIGS. 1 and 4, while the male member 12 and a female member 14 are individually illustrated in FIGS. 2 and 3, respectively.

Figure 2:
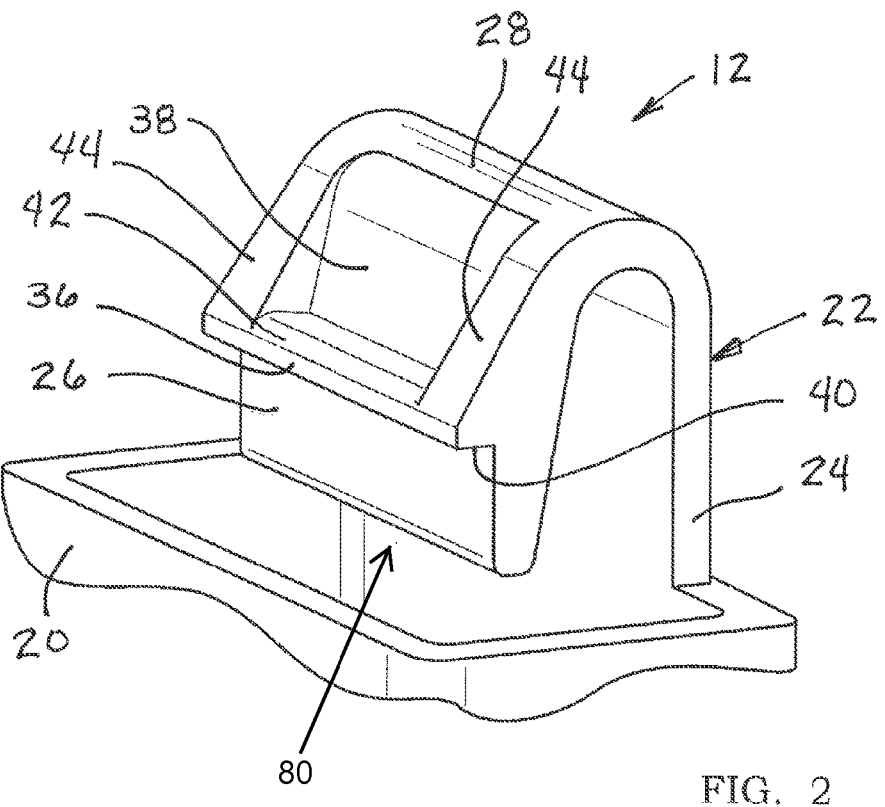
FIG. 2 is a perspective view of the male member.

Referring now to FIG. 2, the male member 12 includes a male body portion 20 that is configured to engage with the female member 14. The manner in which the male member 12 engages with the female member 14 involves the press fitting of the male member 12 through an opening 50 in the female member 14.

Extending from the male body portion 20 is a tab 22. In the illustrated embodiment, the male body portion 20 has a rectangular configuration and the tab 22 extends from one sidewall of the male body portion 20. The tab 22 includes a base end 24, a terminal end 26 in the bight 28 located intermediate therebetween.

The base end 24 projects from the male body portion 20 in a direction generally parallel with the direction of insertion of the male member 12 into engagement with the female member 14. This direction of insertion is generally designated by arrow 30 in FIG. 4. The bight 28 is unitarily formed with the base end 24 and forms a returnly bent section of the tab 22. The terminal end 26 is itself unitarily formed with the bight 28 and projects from the bight in a direction that is generally parallel with, but opposed to, the base end 24.

In its natural or free position 32, which is illustrated by phantom lines in FIG. 4, the terminal end 26 defines a free width ($W_t$) relative to the base end 24. The terminal end 26 is biased into this free position 32 when not engaged with the female member 14. As further discussed below, when engaged with the female member 14, the terminal end 26 of the tab 22 resides in a engaged position, being deflected inward in a direction towards the base end 24. This engaged position is generally illustrated by solid lines in FIG. 4.

Projecting laterally from the terminal end 26 is a flange 36. More specifically, the flange 36 projects from the side surface 38 of the terminal end 26 that faces in a direction away from the base end 24. The flange 36 projects from the terminal end 26 a distance such that it defines a lip 40, the surface of which faces in a direction opposite of the insertion direction 30. The opposing side of the flange 36 may be formed with a rounded or chamfered edge 42 that facilitates deflection of the tab 22 during engagement of the male member 12 with the female member 14. At opposing longitudinal ends of the flange 36, the tab 22 is formed with tab shoulders 44. The tab shoulders 44 are generally formed so as to extend from the bight 28 at an angle until joining with the flange 36 at the end thereof. These tab shoulders 44, while strengthening and reinforcing the flange 36, further serve the purpose of limiting relative movement between the male and female members 12 and 14, as further discussed below. In addition, the terminal end 26 may extend below the flange 36 forming a lever portion 80. The lever portion 80 allows for a biasing force to be applied to the terminal end 26 of the tab 22 and may be used to disengage the flange 36 from the slot 56 formed in the female member 14, thereby releasing the tab 22 from the corresponding opening 50 in the female member 14 and disengaging the male member 12 from the female member.

Figure 3:
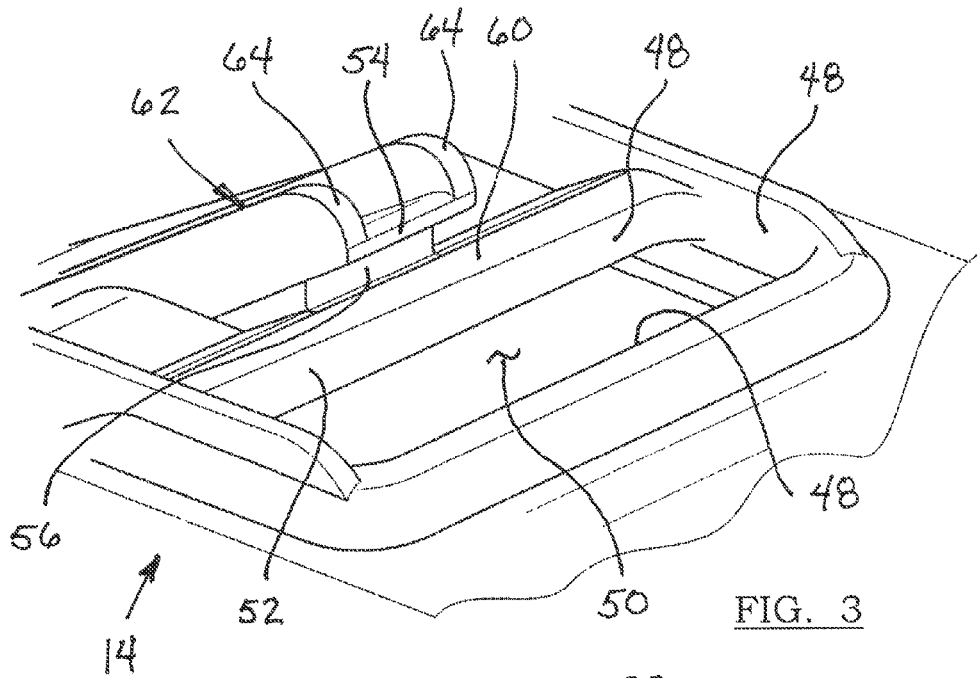
FIG. 3 is a perspective view of the female member.
Figure 4:
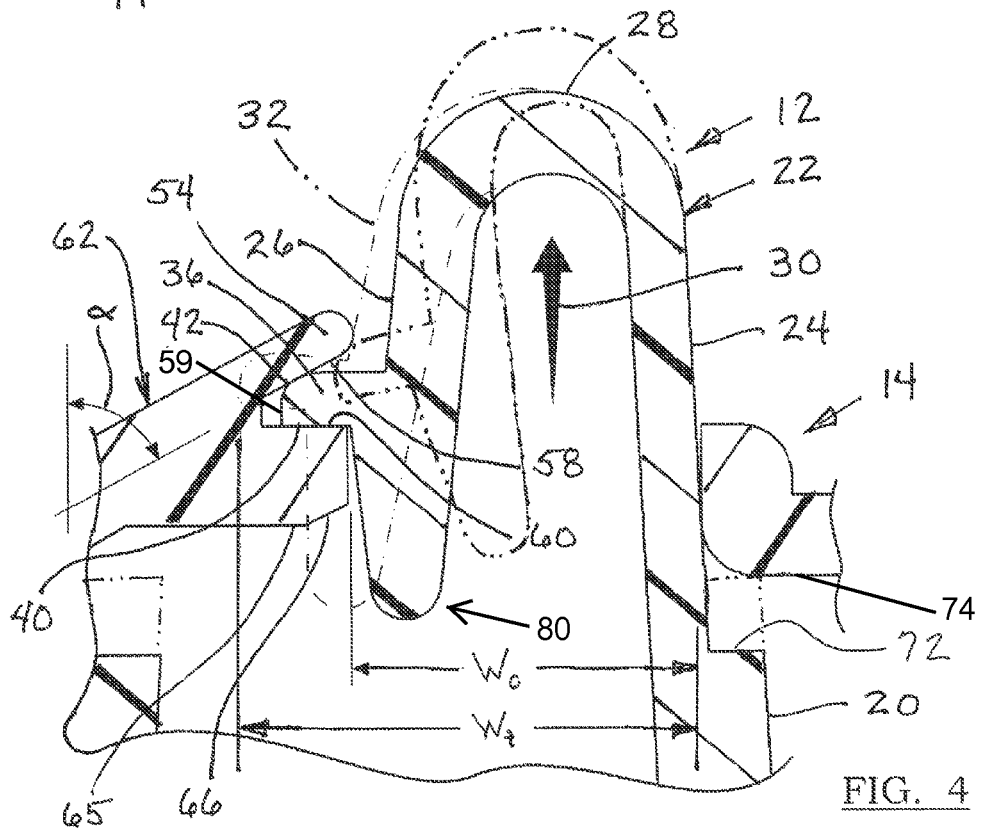
FIG. 4 is a cross-sectional view of the male member engaged with the female member in the engaged position, and illustrating in phantom, the male member in its free position.

Referring now to FIG. 3, the female member 14 includes a female body portion 46 that may be integrally connected to one of the components mentioned above. This connection may be by any variety of means.

Projecting laterally from the terminal end 26 is a flange 36. More specifically, the flange 36 projects from the side surface 38 of the terminal end 26 that faces in a direction away from the base end 24. The flange 36 projects from the terminal and 26 a distance such that it defines a lip 40, the surface of which faces in a direction opposite of the insertion direction 30. The opposing side of the flange 36 may be formed with a rounded or chamfered edge 42 that facilitates deflection of the tab 22 during engagement of the male member 12 with the female member 14. At opposing longitudinal ends of the flange 36, the tab 22 is formed with tab shoulders 44. The tab shoulders 44 are generally formed so as to extend from the bight 28 at an angle until joining with the flange 36 at the end thereof. These tab shoulders 44, while strengthening and reinforcing the flange 36, further serve the purpose of limiting relative movement between the male and female members 12 and 14, as further discussed below. In addition, the terminal end 26 may extend below the flange 36 forming a lever portion 80. The lever portion 80 allows for a biasing force to be applied to the terminal end 26 of the tab 22 and may be used to disengage the flange 36 from the slot 56 formed in the female member 14, thereby releasing the tab 22 from the corresponding opening 50 in the female member 14 and disengaging the male member 12 from the female member.

One of the side portions 48, herein referred to as side rail 52, extends along a side of the opening 50 toward which the terminal end 26 of the tab 22 is disposed. Located adjacent to the side rail 52, and extending from the female body portion 46, is a rib 54. The rib 54 projects from the female body portion 46 and is spaced apart from the side rail 52 such that a slot 56 is defined between the rib 54 and the side rail 52. More specifically, the rib 54 projects such that a lower surface 58 of the rib 54 is oriented at an oblique angle ($\alpha$) relative to the insertion direction 30.

This lower surface 58 of the rib 54 defines an interior surface of the slot 56 and, as seen in FIG. 4, is inclined upward in the insertion direction 30. The opposing interior surface 59 of the slot 56 is defined by an upper surface 60 of the side rail 52. Generally, this upper surface 60 is oriented perpendicularly to the insertion direction 30. Together, the lower surface 58 of the rib 54 and the upper surface 60 of the side rail 52 provides the slot 56 with a V-shaped cross section having depth that is preferably greater than the width of the lip 40, again, as seen in FIG. 4.

The rib 54 is formed by a projection 62 from the female body portion 46, which further includes rib shoulders 64 provided at the opposing ends of the rib 54. The rib shoulders 64 reinforce and strengthen the rib 54 and further define the rib 54 with an overall length that is less than the length of the flange 36 between the tab shoulders 44. In this manner, when in the engaged position, the rib shoulders 64 and the rib 54 are located between the tab shoulders 44. The interaction of the rib shoulders 64 with the tab shoulders 44 therefore limits lateral movement of the male member 12 relative to the female member 14.

During the process of engaging the male member 12 with the female member 14, the bight 28 is first introduced into the opening 50 along the insertion direction 30. Further insertion causes the rounded edge 42 of the flange 36 to engage a lower surface 65 of the side rail 52. This lower surface 65 may be provided with a chamfered edge 66 to cooperate with upper surface and the edge 42 of the flange 36 to cause the terminal end 26 of the tab 22 to deflect inwardly, in a direction toward the base end 24 of the tab 22. In doing so, the tab 22 is resiliently deflected out of the free position 32 to a reduced width position allowing it to pass further through the opening 50. Once the flange 36 has progressed past the side rail 52, the terminal end 26 of the tab 22 resiliently snaps outwardly, towards its free position, as the flange 36 is received within the slot 56.

The construction of the male member 12 and the female member 14 also allows for the over-insertion of the male member 12 into the female member 14. As seen in FIG. 4, in the phantom lines identified at 70, the rounded edge 42 of the flange 36 is capable of and has traveled or progressed up the lower surface 58 of the rib 54 as the male member 12 is over-inserted into the female member 14. The over-insertion is permitted, in part, by the provided distance between the lip 40 of the flange 36 and a shoulder 72 formed on the male body portion 20 adjacent to the base end 24 of the tab 22. By providing this distance as being greater than the distance between upper surface 60 of the side rail 52 and the lower surface of the female member 14 adjacent to the opening 50, the flange 36 is permitted to progress up the lower surface 58. The first distance, however, must be such that the flange 36 is not over-inserted to an extent that it traverses past the end of the rib 54 itself. As depicted in FIG. 4, the position that the male member 12 is permitted to be over-inserted relative to the female member 14 may be limited by contact between the shoulder 72 of the male body portion 20 and a base surface 74 of the female member 14. Additionally, as depicted in FIG. 4, the shoulder 72 of the male body portion 20 may be spaced apart from the base surface 74 of the female member 14 when the male member 12 is in the engaged position with the female member 14.

Barring that situation, the inherent outward biasing of the terminal end 26 of the tab 22 causes the rounded edge 42 of the flange 36 to be forced into engagement with the obliquely oriented, lower surface 58 of the rib 54. This biasing of the flange 56 into engagement with the rib 54 within the slot 56 causes the flange to progress downward along the lower surface 58 in a direction toward the bottom of the slot 56 and, once positioned therein, the inherent biasing will cause the base end 24 of the tab 22 to engage the opposing side surface 48 defining the opening 50. This constant pressure exerted on the retention clip assembly 10, and more particularly the constant biasing of the flange 56 with the rib 54 and within the slot 56, limits movement and vibration, both of which could be the source of undesirable noises.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A retention clip assembly for connecting first and second components together, the retention clip assembly comprising:
   a male member and a female member, the male member being configured to engage the female member in an engaged position;
   the male member having a male body portion and a tab extending from the male body portion, the tab including a base end that extends away from the male body portion and a terminal end that extends towards the male body portion, the terminal end defining a free position relative to the base end and being resiliently deflectable out of the free position and towards the base end, the free position defining a free width $W_f$ relative to the base end, wherein the tab of the male member further comprises a flange projecting laterally from a side surface of the terminal end, the flange comprising a lip;
   the female member having a female body portion, the female body portion including sides defining an opening configured to receive the base end and the terminal end of the tab of the male member therein, the female member further including a rib adjacent to one of the sides defining the opening, a slot being defined between the rib and the one of the sides defining the opening, the rib of the female member comprising a lower surface that defines an interior of the slot, wherein:
   the opening defines an opening width that is less than the free width and the flange is positioned in the slot in the engaged position of the male member with the female member, the flange being resiliently biased into contact with the rib in the engaged position;
   the lip of the flange is maintained in contact with the lower surface of the rib when the male member is positioned in the engaged position relative to the female member;
   the male member is inserted into the female member in an insertion direction; and
   the lower surface of the rib is inclined in the insertion direction relative to the opening and contacts the flange of the terminal end of the male member when the male member is positioned in the engaged position relative to the female member or when the male member is positioned in an over-insertion position relative to the female member in which the lip of the flange is spaced apart from an opposing interior surface of the slot in the insertion direction.

2. The retention clip assembly of claim 1, wherein:
   the male member is inserted into the female member in an insertion direction; and
   the rib extends at an angle that is transverse relative to the one of the sides defining the opening and at an angle that is transverse relative to the insertion direction.

3. The retention clip assembly of claim 1, wherein the slot has a generally V-shaped cross section.

4. The retention clip assembly of claim 1, wherein the tab includes a bight located intermediate of the base end and the terminal end, the base end extending in a first direction to the bight, the bight defines a reversely bent section of the tab between the base end and the terminal.

5. The retention clip assembly of claim 1, wherein:
the male body portion of the male member comprises a shoulder from which the base end of the tab extends; and
a distance from the shoulder to the lip of the flange of the male member is greater than a distance from a base surface to the lower surface of the female member such that the shoulder of the male member is spaced apart from the base surface of the female member when the male member is positioned in the engaged position relative to the female member.

6. The retention clip assembly of claim 1, wherein the terminal end extends below the flange and forms a lever portion.

7. A retention clip assembly for connecting first and second components together, the retention clip assembly comprising:
a male member and a female member, the male member being configured to engage the female member in an engaged position;
the male member having a male body portion and a tab extending from the male body portion, the tab including a base end that extends away from the male body portion and a terminal end that extends towards the male body portion, the terminal end defining a free position relative to the base end and being resiliently deflectable out of the free position and towards the base end, the free position defining a free width $W_f$ relative to the base end, wherein the tab of the male member further comprises a flange projecting laterally from a side surface of the terminal end, the flange comprising a lip;
the female member having a female body portion, the female body portion including sides defining an opening configured to receive the base end and the terminal end of the tab of the male member therein, the female member further including a rib adjacent to one of the sides defining the opening, a slot being defined between the rib and the one of the sides defining the opening, the rib of the female member comprising a lower surface that defines an interior of the slot, wherein:
the opening defines an opening width that is less than the free width and the flange is positioned in the slot in the engaged position of the male member with the female member, the flange being resiliently biased into contact with a surface of the rib in the engaged position, the surface of the rib being generally obliquely oriented to a direction of projection of the flange from the terminal end;
the lip of the flange is maintained in contact with the lower surface of the rib when the male member is positioned in the engaged position relative to the female member;
the male member is inserted into the female member in an insertion direction; and
the lower surface of the rib is inclined in the insertion direction relative to the opening and contacts the flange of the terminal end of the male member when the male member is positioned in the engaged position relative to the female member or when the male member is positioned in an over-insertion position relative to the female member in which the lip of the flange is spaced apart from an opposing interior surface of the slot in the insertion direction, the opposing interior surface of the slot extending to a position that is inside of the free width of the terminal end of the male member.

8. The retention clip assembly of claim 7, wherein the slot has a generally V-shaped cross section.

9. The retention clip assembly of claim 7, wherein the tab includes a bight located intermediate of the base end and the terminal end, the base end extending in a first direction to the bight, the bight defines a reversely bent section of the tab between the base end and the terminal.

10. The retention clip assembly of claim 7, wherein:
the male body portion of the male member comprises a shoulder from which the base end of the tab extends; and
a distance from the shoulder to the lip of the flange of the male member is greater than a distance from a base surface to the lower surface of the female member such that the shoulder of the male member is spaced apart from the base surface of the female member when the male member is positioned in the engaged position relative to the female member.

11. A retention clip assembly for connecting first and second components together, the retention clip assembly comprising:
a male member and a female member, the male member being configured to engage the female member in an engaged position;
the male member comprising:
a male body portion comprising a shoulder; and
a tab that extends from the shoulder of the male body portion, the tab including a base end, a terminal end that extends a direction that is transverse to the base end and towards the body portion, wherein the terminal end of the tab further comprises a flange that projects laterally from the side surface of the terminal end and has a lip, wherein the terminal end:
defines a free position of the male member;
is deflectable away from the free position; and
defines a free width relative to the male body portion when the terminal end is positioned in the free position, and
the female member comprising:
a female body portion comprising sides that define an opening that is configured to receive the tab of the male member therein;
a rib adjacent to one of the sides defining the opening of the female body portion; and
a slot positioned between the rib and one of the sides of the female body portion that defines the opening, the slot comprising an interior that is defined by a lower surface of the rib;
wherein:
the opening of the female body portion defines an opening width that is less than the free width of the male member;
the flange of the male member is positioned in the slot of the female member when the male member is positioned in the engaged position with the female member, the flange being resiliently biased into contact with the rib in the engaged position;
the male member is inserted into the female member in an insertion direction;
the lip of the flange is maintained in contact with the lower surface of the rib when the male member is positioned in the engaged position relative to the female member;
the lower surface of the rib is inclined in the insertion direction relative to the opening and contacts the flange of the terminal end of the male member when the male member is positioned in the engaged position relative to the female member or when the male member is positioned in an over-insertion position relative to the female member in which the lip of the flange is spaced apart from an opposing interior surface of the slot in the insertion direction; and a distance from the shoulder to the lip of the flange of the male member is greater than a distance from a base surface to the lower surface of the female member such that the shoulder of the male member is spaced apart from the base surface of the female member when the male member is positioned in the engaged position relative to the female member.

12. The retention clip assembly of claim 11, wherein the base end of the tab extends to a bight and the terminal end extends from the bight in a direction that is transverse to the base end and towards the body portion such that the bight is positioned at a further distance from the male body portion than the terminal end.

13. The retention clip assembly of claim 11, wherein the opposing interior surface of the slot that is opposite the lower surface of the slot extends to a position that is inside of the free width of the terminal end of the male member.

* * * * *

UNITED STATES PATENT AND TRADEMARK OFFICE
CERTIFICATE OF CORRECTION

| | | |
|---|---|---|
| PATENT NO. | : 9,157,466 B2 | Page 1 of 1 |
| APPLICATION NO. | : 13/628351 | |
| DATED | : October 13, 2015 | |
| INVENTOR(S) | : William A. Hardy and Edgar C. Herrera | |

It is certified that error appears in the above-identified patent and that said Letters Patent is hereby corrected as shown below:

In The Specification

In Column 04, Delete Lines 29 to 52 and Insert --Generally, the female body portion 46 includes side portions 48 defining an opening 50. The opening 50 is sized to receive the tab 22 of the male member 12 therein. In this regard, the length of the opening 50 is greater than the length of the tab 22, as this latter length is measured along the side of the male body portion 20 from which the tab 22 extends. For the purposes further discussed below, the width ($W_o$) of the opening 50 is less than the overall width ($W_t$) of the tab 22 in the free position, which takes into account the width of the tab 22 including the flange 36.-- therefor.

Signed and Sealed this
Twenty-ninth Day of March, 2016

Michelle K. Lee
*Director of the United States Patent and Trademark Office*